United States Patent
Paris Carballo et al.

(10) Patent No.: US 9,856,013 B2
(45) Date of Patent: Jan. 2, 2018

(54) DEFORMABLE WING INCLUDING A MOBILE UPPER SURFACE

(71) Applicant: UNIVERSIDAD DE SEVILLA, Seville (ES)

(72) Inventors: Federico Paris Carballo, Seville (ES); José Cañas Delgado, Seville (ES); Jesús Justo Estebaranz, Seville (ES); Damián Rivas Rivas, Seville (ES); Antonio Franco Espín, Seville (ES); Sergio Esteban Roncero, Seville (ES); Francisco Gavilán Jiménez, Seville (ES); Francisco Tinoco Franco, Cádiz (ES)

(73) Assignee: Universidad de Sevilla, Seville (ES)

( * ) Notice: Subject to any disclaimer, the term of this patent is extended or adjusted under 35 U.S.C. 154(b) by 0 days.

(21) Appl. No.: 14/428,031

(22) PCT Filed: Sep. 13, 2013

(86) PCT No.: PCT/ES2013/000205
§ 371 (c)(1),
(2) Date: Jun. 17, 2015

(87) PCT Pub. No.: WO2014/041221
PCT Pub. Date: Mar. 20, 2014

(65) Prior Publication Data
US 2015/0298792 A1 Oct. 22, 2015

(30) Foreign Application Priority Data
Sep. 13, 2012 (ES) .................................. 201200910

(51) Int. Cl.
*B64C 39/12* (2006.01)
*B64C 3/38* (2006.01)
(Continued)

(52) U.S. Cl.
CPC .................. *B64C 3/38* (2013.01); *B64C 3/48* (2013.01); *B64C 2003/445* (2013.01)

(58) Field of Classification Search
None
See application file for complete search history.

(56) References Cited

U.S. PATENT DOCUMENTS

| 1,567,531 A | * | 12/1925 | Magni | ....................... B64C 3/48 244/215 |
| 1,749,021 A |   | 3/1930  | Davis |                                            |

(Continued)

FOREIGN PATENT DOCUMENTS

| FR | 922899 A | * | 6/1947 | ............... B64C 3/48 |
| GB | 103400 A | * | 1/1917 | ............... B64C 3/48 |

(Continued)

*Primary Examiner* — Richard G Davis
(74) *Attorney, Agent, or Firm* — McNees Wallace & Nurick LLC

(57) ABSTRACT

Morphing aircraft wing with a mobile upper surface comprising a double skinning on the upper surface of the wing wherein one of the skinnings corresponds to the leading edge and the other corresponds to the trailing edge and they overlap in the central area of the wing with the possibility of relative displacement between the two skinnings and they extend in the direction of the chord of the wing profile, the wing comprises actuators that are positioned on the main wing spars and which exert a reaction force against said spars when they exert the force required to morph the wing displacing the skinnings in the direction of the chord of the profile to the configuration of low speed flight, take-off and landing.

2 Claims, 4 Drawing Sheets

(51) Int. Cl.
*B64C 3/48* (2006.01)
*B64C 3/44* (2006.01)

(56) References Cited

U.S. PATENT DOCUMENTS

| | | | |
|---|---|---|---|
| 6,015,115 | A | 1/2000 | Dorsett et al. |
| 6,347,769 | B1 | 2/2002 | To et al. |
| 6,622,974 | B1 | 9/2003 | Dockter et al. |
| 7,878,460 | B2 | 2/2011 | Armstrong et al. |
| 9,284,914 | B2 * | 3/2016 | Webster .................... F02K 1/06 |
| 2012/0104181 | A1 * | 5/2012 | Rix .......................... B64C 3/48 244/219 |
| 2015/0298792 | A1 | 10/2015 | Paris Carballo et al. |

FOREIGN PATENT DOCUMENTS

| | | | |
|---|---|---|---|
| GB | 103400 A1 | 1/1917 | |
| WO | 03/082671 A1 | 10/2003 | |
| WO | WO 03082671 A1 * | 10/2003 | ............... B64C 3/48 |

\* cited by examiner

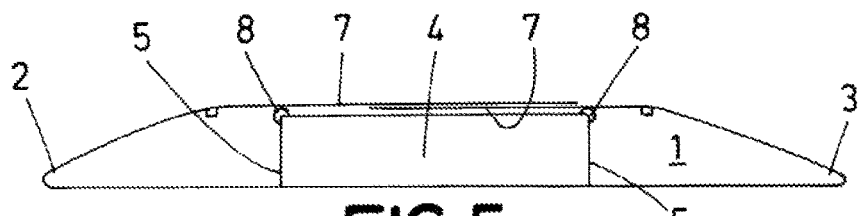
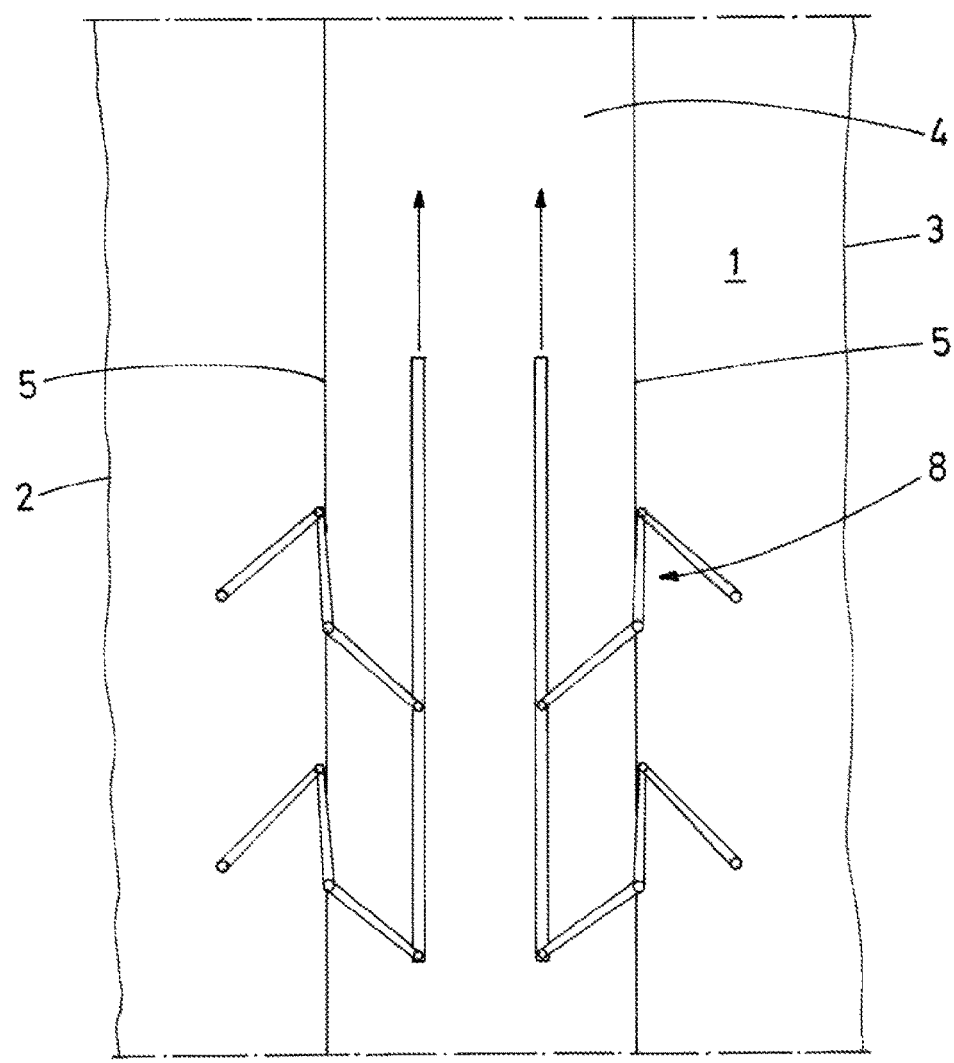

DEFORMABLE WING INCLUDING A MOBILE UPPER SURFACE

The present invention is comprised within the context of aeronautics. In particular, a morphing wing that allows flight at low speeds and during take-off and landing is proposed.

STATE OF THE ART

It is well known from the prior art that the geometry of an aircraft wing must be changed depending on the flight regime. In general, the basic design of the wing is made for cruising in which an aerodynamically clean configuration is used, and should be modified for flight at low speeds, especially during take-off and landing. The traditional system consists of acting on moving surfaces which are, the slats that are located at the leading edge of the wing, and the flaps which are located on the trailing edge. By acting on the slats and flaps the wing surface is modified. Once these elements have been deflected, the overall lift of the aircraft wing can be maintained by increasing the curvature of the wing profile and by an increased wing surface. These traditional high lift devices are described in numerous patents, such as documents U.S. Pat. Nos. 1,749,021 and 7,878,460. These devices are decoupled from the wing torsion box and complex mechanisms external to the wing are required for acting on them.

Currently, the use of advanced materials makes it possible to design morphing wings achieving similar effects to those achieved with flaps by morphing the leading and trailing wing edges, as described in the article "The Aircraft Morphing Program" by Wlezien et al.

Patent U.S. Pat. No. 6,015,115 modifies the wing shape by using inflatable elements, located at the leading and trailing edges, which increase the curvature. Patent U.S. Pat. No. 6,347,769 also uses inflatable elements, by means of a pressurized air system, with which the wing profile is compressed, increasing the curvature of said profile, but with the disadvantage of decreasing its chord. The chord of a wing profile is the imaginary straight line drawn between the leading edge and the trailing edge. Furthermore, patent U.S. Pat. No. 6,622,974 describes a morphing wing that includes a rigid inner core surrounded by an extensible spar which in turn includes an inflatable elastomeric element which modifies the geometry of the wing.

The publication "Development of a Simple Morphing Wing Using Elastomeric Composites as Skins and Actuators" by Peel et al. describes a flexible wing comprising actuators which internally traction the leading and trailing edges, which causes the wing to contract, increasing curvature. Again, the same problem as in the preceding cases is encountered whereby there is a chord decrease. The prior art also includes a flexible wing wherein the morphing of the inner wing structure flexes the trailing edge, increasing the curvature. In this case the leading edge is not morphed.

EXPLANATION OF THE INVENTION

This invention arises from the growing need to respond to a high demand for higher performance microlight aircraft in terms of an optimal design, comfort and ability to combine high speeds with long ranges, all this together with affordable prices. In order to be more competitive in the market, the development of new products that provide reductions in weight and mechanical systems that simplify the design and maintenance of aircraft is targeted.

Due to different speeds during the various stages of flight, the wing is designed to be efficient in one configuration. Preference is usually given to wing efficiency during cruise configuration. It is therefore necessary for the wing to adjust, by some system, to lower speed flight, while maintaining the same performance. Traditionally, the system used for this purpose comprises flap devices such as flaps and slats that are deployed during take-off and landing giving the wing an increased lift coefficient that maintains the overall lift of the wing at low speeds. The problem with the devices known in the prior art is that they are heavy, they have many mechanical parts to be checked and they interfere with wing aerodynamics in having to use external devices thereof. Therefore, this invention is presented, wherein the wing is morphed to adjust to the optimal form in the different flight configurations, by displacing the wing upper surface skinning. With this system the leading and trailing edges of the wing are morphed, and traditional lift devices are eliminated. Furthermore, this wing morphing system allows the profile to change without reducing its chord, this being one of the disadvantages of wing morphing systems in the prior art.

The wing of the present invention greatly reduces the weight of the wing compared to the wings known in the prior art, it is possible to reduce maintenance costs and improve the aerodynamic characteristics of the wing, particularly in the take-off and landing configurations, so that the overall performance of the aircraft carrying these wings is implemented.

The wing of the invention is morphed depending on the aerodynamic requirements of each situation, such that the pilot can choose to morph the wing, going from an optimal wing profile for cruise to an optimal wing profile for low speeds.

The wing of the present invention is morphed in the leading edge and trailing edge areas. The length to be morphed spanwise may be different in the leading edge and in the trailing edge, allowing, for instance, all the leading edge and only two-thirds of the trailing edge to be morphed, thus leaving a free zone for the aerofoils.

The wing also comprises a torsion box, whose walls are formed by the lower surface of the wing, the main wing spars and an upper skin other than the upper surface skinning of the wing.

The key factor of the wing of the present invention is that it includes a double skinning on the upper surface, which is different for the leading edge and for the trailing edge. This double skinning overlaps in the central area and allows for the relative displacement between the two parts, corresponding to the leading edge and to the trailing edge, in the direction of the chord. The movement of the double upper surface skinning is achieved by means of actuators which allow the morphing of the wing skin to the limits established by the ideal configuration for low speed flight. The actuators are supported on the main wing spars which delimit the torsion box. The actuators exert a reaction force on said spars.

Also the wing comprises a locking system that ensures the landing configuration, so that, in the event of malfunction of the actuators or of the double skinning of the upper surface, wing capabilities are not compromised in the last phase of flight.

The wing of the present invention has the ability to change the shape of the aerofoil without prejudice to the aerodynamic capabilities or structural integrity. The locking system makes the wing always safe because it will tend to the deployed position, thus achieving to ever successfully complete the landing.

Throughout the description and claims the word "comprise" and its variations are not intended to exclude other technical features, additives, components or steps. To those skilled in the art, other objects, advantages and characteristics of the invention will arise partly from the description and partly from practice of the invention. The following examples and drawings are provided by way of illustration, and are not intended to limit the scope of the present invention. Furthermore, the present invention covers all possible combinations of particular and preferred embodiments set forth herein.

BRIEF DESCRIPTION OF THE DRAWINGS

FIG. 5a-5b show a different embodiment of the wing of the invention in cruising flight configuration and a section of the wing to show the actuators of the wing which are placed on the main wing spars.

REFERENCES

Figure 1:
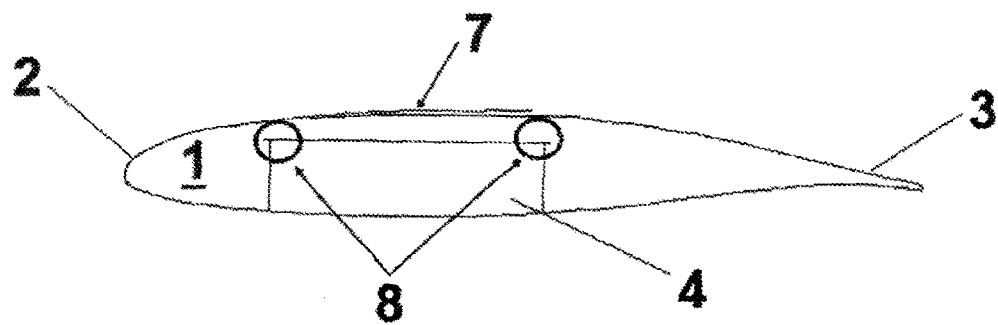
FIG. 1 shows the wing of the invention in cruising flight configuration wherein the skinnings are placed one on another in the central part of the wing.
Figure 2:
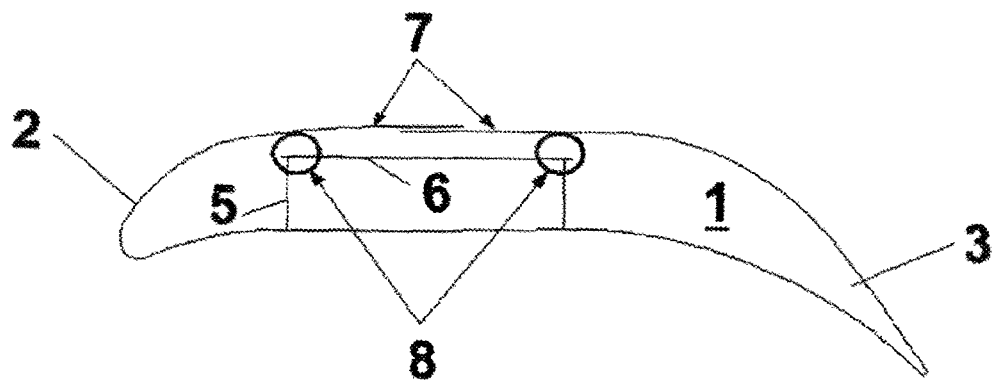
FIG. 2 shows the wing of the invention in flight at low speed configuration and the morphing of the wing is seen on the leading edge and on the trailing edge.
Figure 3:
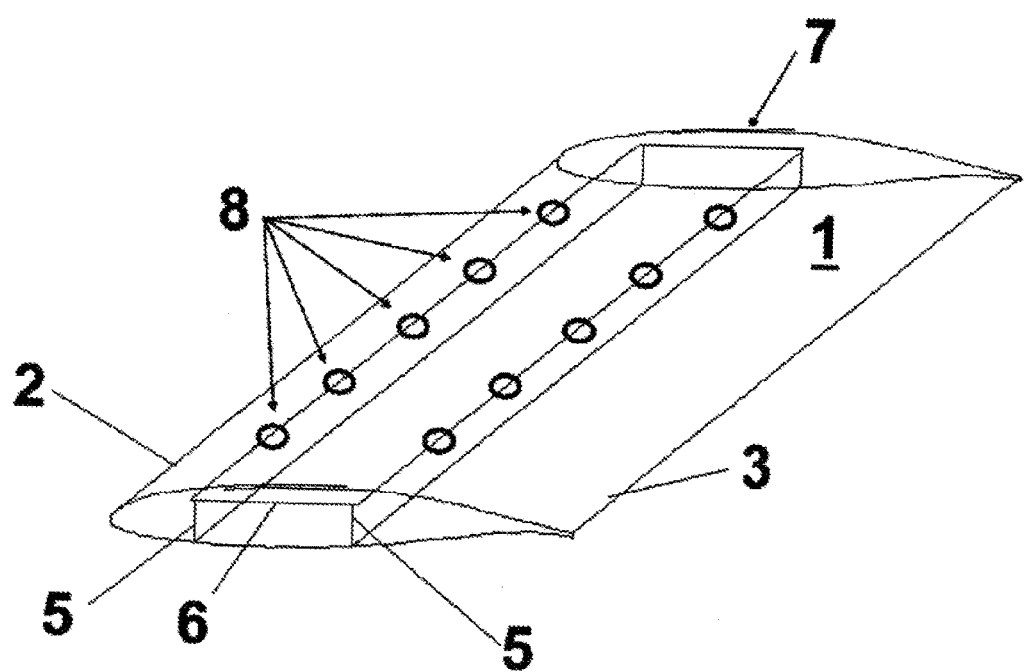
FIG. 3 shows a perspective of the wing wherein the torsion box with its component parts and the wing itself are viewed.
Figure 4A:
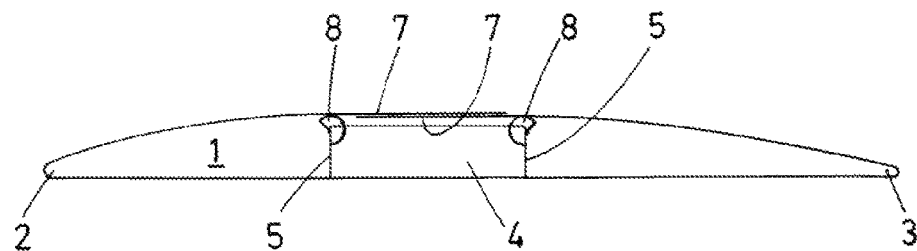
FIG. 4a-4c show an embodiment of the wing of the invention in cruising flight configuration and low speed configuration and a section of the wing to show the actuators of the wing which are placed on the main wing spars.
Figure 4B:
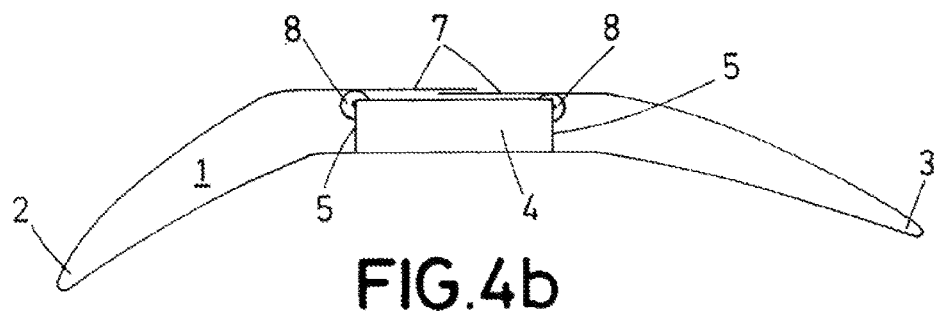
Figure 4C:
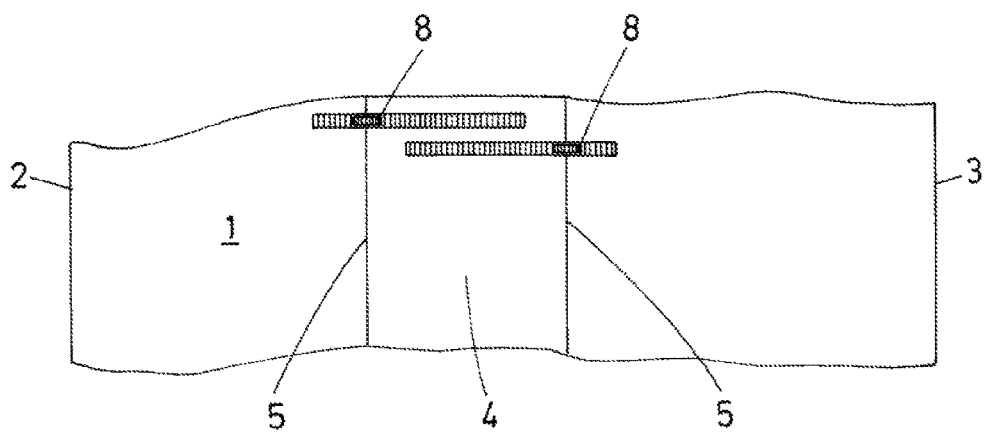

1: Wing; 2: Leading edge; 3: Trailing edge; 4: Torsion box; 5: Spars; 6: Upper skin; 7: Skinnings; 8: Actuators

DETAILED STATEMENT OF EMBODIMENTS

The wing of the present invention is a morphing wing with a mobile upper surface. Morphing of the wing allows its adjustment to an aerodynamically favourable profile for the aircraft flight at low speed configuration, and more specifically for take-off and landing. A great advantage of the present invention is that when the wing morphs to conform to the configuration of low-speed flight, the chord does not decrease, whereby the lifting capacity of the wing does not decrease.

The wing (1) comprises a leading edge (2) and a trailing edge (3) which are morphing. Each of these edges may morph a different length depending on the aerodynamic needs. Inside the wing (1) there is a torsion box (4) whose walls are formed by the lower surface of the wing, the main wing spars (5) of the wing and an upper skin (6). On said upper skin (6) of the torsion box (4) there is double skinning (7) of the upper surface of the wing. One of the skinnings (7) corresponds to the leading edge (2) skinning and another corresponds to the trailing edge (3) and they overlap in the central area of the wing with the possibility of relative displacement between the two parts. Such skinnings (7) extend in the direction of the wing profile chord. The wing comprises actuators (8) which are placed on the main wing spars (5) and which exert a reaction force against said spars (5) when exerting the required force to morph the wing skinning, moving the skinnings (7) in the direction of the chord. The actuators (8) allow the morphing of the wing skinning to the limits established by the ideal configuration to fly at low speeds. The wing (1) also comprises a locking system in case of failure that ensures the morphed configuration of the wing and thus safe landing.

Another object of the present invention is an aircraft comprising wings as described above.

The invention claimed is:

1. An aircraft wing comprising:
   a leading edge and a trailing edge configured to morph; and
   a torsion box inside the wing wherein walls of said torsion box are formed by:
      a portion of a lower surface of the wing;
      main wing spars of the wing; and
      an upper skin;
      wherein over the upper skin of the torsion box there is a double skinning of the upper surface of the wing, wherein;
      a first of said skinnings corresponds to the leading edge; and
      a second of said skinnings corresponds to the trailing edge;
      said skinnings overlap in a central area of the wing with relative displacement between the two skinnings;
   said skinnings are configured to extend in the direction of a chord of the wing;
      the wing further comprises actuators placed on the main wing spars; said actuators configured to exert a reaction force against said main wing spars when said actuators exert a force required to morph the wing by displacing the skinnings in the direction of the chord of the wing to the configuration of low speed flight, take-off and landings;
      wherein the portion of the lower surface of the wing that forms a wall of the torsion does not move when the double skinning of the upper surface of the wing is moved; and
      wherein the wing is configured to change its profile without changing the chord length.

2. An aircraft comprising at least one aircraft wing of claim 1.

* * * * *